P. MUELLER & A. C. SCHUERMANN.
METER HANGER.
APPLICATION FILED NOV. 21, 1910.
1,006,398.
Patented Oct. 17, 1911.
2 SHEETS—SHEET 1.
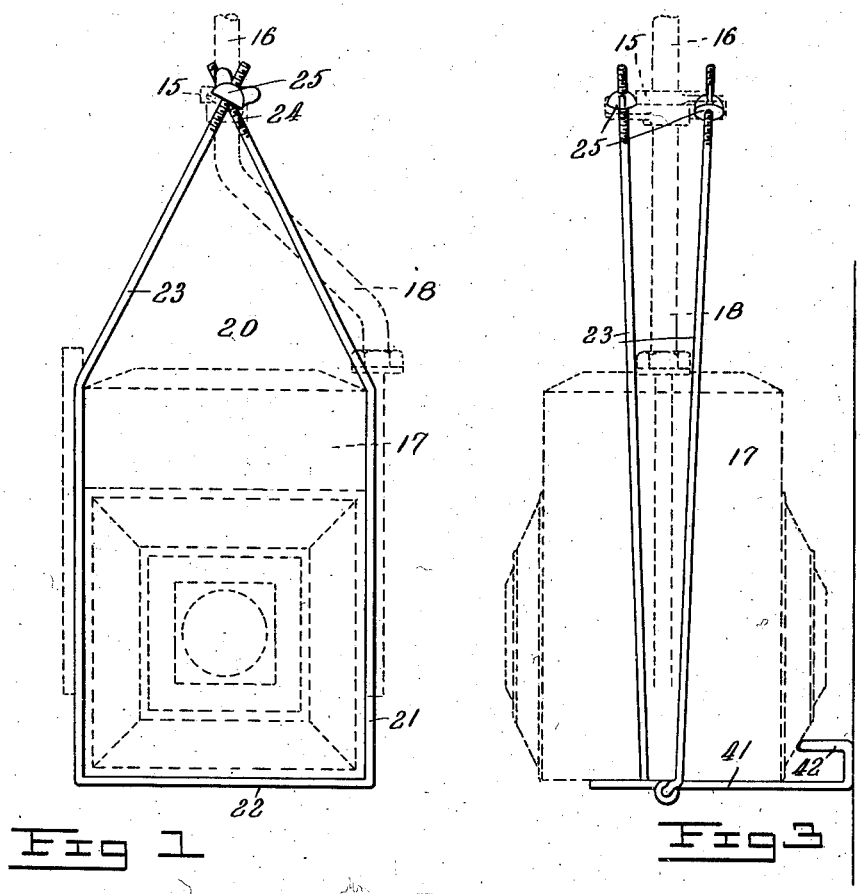
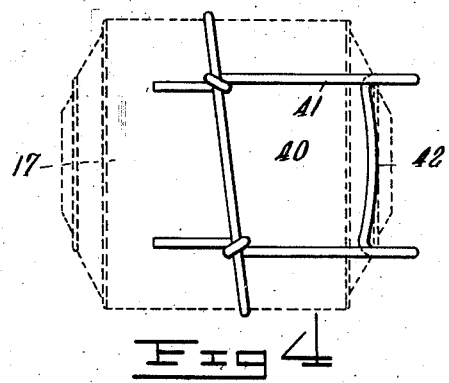
Witnesses
Inventors
Philip Mueller
Anton C. Schuermann
By Meyers, Cushman & Rea
Attorneys P. MUELLER & A. C. SCHUERMANN.
METER HANGER.
APPLICATION FILED NOV. 21, 1910.
1,006,398.
Patented Oct. 17, 1911.
2 SHEETS—SHEET 2.
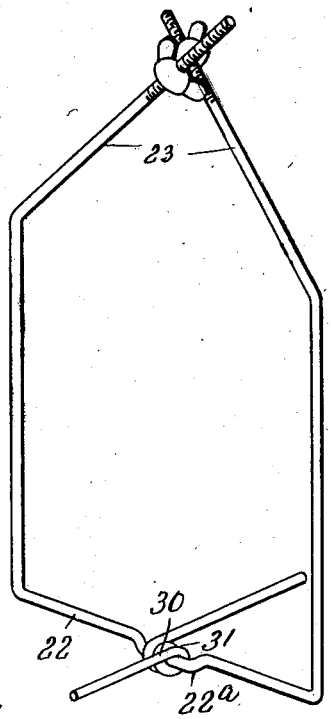
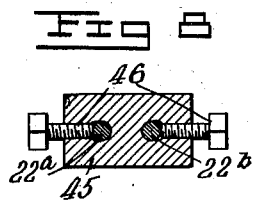
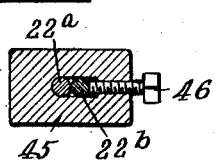
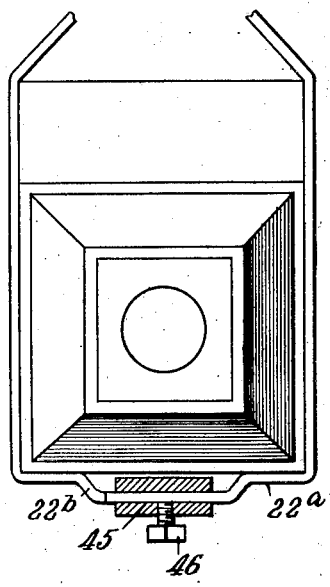
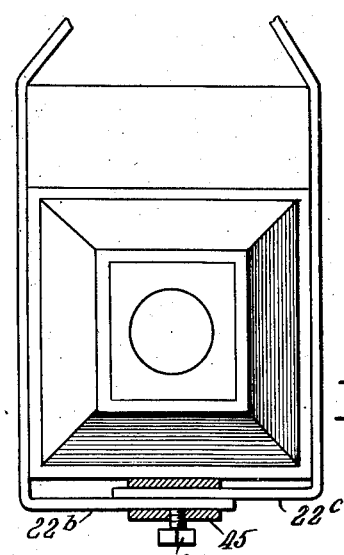
Witnesses
Inventors
Philip Mueller
Anton C. Schuermann
By Meyers, Cushman & Rea
Attorneys

UNITED STATES PATENT OFFICE.

PHILIP MUELLER AND ANTON C. SCHUERMANN, OF DECATUR, ILLINOIS, ASSIGNORS TO H. MUELLER MANUFACTURING COMPANY, OF DECATUR, ILLINOIS, A CORPORATION OF ILLINOIS.

METER-HANGER.

1,006,398.          Specification of Letters Patent.      Patented Oct. 17, 1911.

Application filed November 21, 1910. Serial No. 593,591.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Meter-Hangers, of which the following is a specification.

Our invention relates to improvements in means for supporting meters in position when connected to the service and street pipes, and has more particular relation to devices of this character which are adapted to receive the meter and support it centrally in the manner of a hanger.

The present invention relates more particularly to the member within which the meter is to be received, the structures shown herein being of the type disclosed in our companion applications filed July 22, 1910, Serial Nos. 573,324 and 573,325, said companion applications having reference more particularly to the manner in which these members are supported from the service and street pipes.

The principal object of this invention is to provide a supported member in the form of a bail, loop, stirrup or similar configuration, which has its direction of length formed in such manner as to extend around the sides and bottom of a meter and be attached to supporting means above the top of the meter, the device being in the form of a single strip or of a plurality of strips adjustably connected together, as desired, or the construction may be varied to include a pivoted member or members carried by the bottom supporting portion of the stirrup, the pivotal member or members being adapted to extend on opposite sides of the direction of length of the stirrup bottom portion to provide an extended support for the meter, and said support may be so formed as to place the stirrup a predetermined distance from the wall, and may, if desired, be in a form to also retain the meter against a movement into contact with the wall.

A further object is to provide a structure which is exceedingly simple and efficient in operation, durable in construction, readily placed in position, of a weight which will place no undue strain on the supporting pipe, and which can be manufactured at a relative low cost.

To these, and other ends, the nature of which will be readily understood as our invention is hereinafter disclosed, the invention consists in the improved combination and construction of parts, hereinafter fully described, illustrated in the accompanying drawings, and particularly pointed out in the appended claims.

In the drawings, in which similar reference characters indicate similar parts in each of the views,—Figure 1 is a front elevation of one form of the hanger, a meter and its connections being shown as supported therein in dotted lines. Fig. 2 is a perspective view of a hanger, modified to provide the additional pivotal support for the meter. Fig. 3 is a side elevation of a still further modification, the hanger being shown as provided with the extended meter support formed to space the meter from the adjacent wall, the meter and its connections being shown in dotted lines. Fig. 4 is a bottom plan view of the parts shown in Fig. 3. Fig. 5 is an elevation partly in section of a stirrup formed to permit adjustment in width to accommodate for variation in size of meters. Fig. 6 is a similar view of a slightly modified form. Figs. 7 and 8 are cross-sectional views taken through the connector of the stirrup to show various ways in which the wires may be mounted.

The hanger member herein disclosed, is preferably formed of stout wire, and is in the form of a stirrup, loop, bail, or similar type, and which extends around from one side of the meter across the bottom and up the other side, so as to provide a structure within which the meter may be seated, as indicated in Figs. 1, 2 and 3, the free ends of the hanger being bent inwardly and screw-threaded for attachment to a suitable support carried by the meter connections.

In the form shown in Figs. 1, 2 and 4, the hanger member is in the form of a single piece of material so far as the stirrup portion is concerned.

In the structure shown in Figs. 5 to 8 inclusive, the stirrup is formed of two parts, adjustably connected together to permit of variations in the widths of meters.

The simplest form of stirrup is indicated in Fig. 1, in which the stirrup is designated as 20, the sides thereof as 21, the bottom as 22, and the inwardly extending end portions as 23. We prefer to screw-thread the free ends, as at 24, to receive suitable nuts 25, but it is to be understood that, if desired, the form of connecting the free ends to the support may be varied without departing from the spirit of the invention, any well known configuration which will serve to permit the free ends to be removably or permanently secured to a support, being equally adaptable for use, the screw-threaded connection shown, being preferred by reason of the ability to adjust the position of the meter relative to the support in a vertical direction.

In the stirrup shown in Fig. 2, the bottom is preferably set to provide an offset 22$^a$, around which is bent a pivotal member 30 of wire, said member being provided with an intermediate coil of one or more convolutions, as at 31, the free ends of the member extending in opposite directions and preferably on approximately the plane of the plane of the bottom portion 22. This places the top plane of the bottom 22 and member 30 on practically coincident planes so that a meter within the stirrup will rest on the bottom and on the two free ends or arms of the member 30, providing the equivalent of an extended base for the meter without actually rigidly connecting the parts together. We preferably form the member 30 with one arm of greater length than the other, the arm of greater length being adapted to project beyond the meter to contact with the walls of the room where the meter is installed.

As a further embodiment and the carrying forward of the invention, we may form the pivotal member as in Figs. 3 and 4, in which this member is indicated at 40 and formed of two spaced apart arms 41 coiled about the bottom 22 as in Fig. 2, and having the arms of greater length connected together, the connection being formed by bending the single wire rearwardly and downwardly from opposite sides of the approximate center of the piece of wire, and then continuing these ends forwardly in the form shown in Fig. 2, the intermediate portion, indicated at 42, being, if desired, bent to approximately conform to the shape of the back of the meter. In this form the bottom 22 may be offset or not as desired, the presence of the two arms being sufficient to properly support the meter whether the latter rests in contact with the upper face of the bottom 22, or not.

From the above it will be readily understood that we have provided a hanger for meters of particular advantage, the hanger being suspended from a support of suitable character, such as indicated in Figs. 1 and 3, at 15, said support being carried by the service or street pipes, indicated as 16. The stirrup form of hanger permits the meter, indicated as 17 to be positioned in such a manner as to entirely take away from the meter connections 18, all strain due to the weight of the meter, the material of the stirrup and the connections of the stirrup and support being such as to permit of the necessary vertical adjustment of the meter to assure the elimination of weights on the connections. And by the use of the member 30, the position of the hanger with respect to the wall is fixed without adjustment, the forwardly extending arm being of a length not sufficient to project outwardly beyond the face of the meter, as indicated in Fig. 3 the meter having an efficient and extended support, as heretofore pointed out. Furthermore, the structures shown in Figs. 3 and 4, not only provide for a positioning of the hanger or stirrup relative to the wall, but at the same time provide a member which will present a movement of the meter into contact with the wall, thereby spacing the meter and eliminating liability of the latter rusting out due to dampness of the walls. As will be obvious, the fact that the hanger is supported entirely by the tight connections, the material of the wall is of no importance, since there is no requirement of providing a supporting engagement of any part of the hanger with the wall.

While the stirrup may be formed of a single piece of wire, as heretofore described, it will be readily understood that an equally efficient result may be obtained by making the stirrup adjustable in width, as indicated in Figs. 5 and 6, in which the bottom 22 is formed in two parts, 22$^b$ and 22$^c$, the free ends of said parts extending into or through a connector 45, carrying one or more adjusting screws 46 or similar securing means, for the purpose of adjusting the width of the stirrup by a suitable adjustment of the length of the bottom 22. In Figs. 5 to 8, we show various ways in which this adjustable idea may be carried out, and while we disclose these various ways, it will be obvious that other well known forms of adjustable connections may be employed with equal efficiency. In Fig. 5 the free ends of the members or parts 22$^b$ and 22$^c$ are shown as in vertical alinement, while in Fig. 6 this alinement is horizontal, the structure in the latter case also including the offset feature so as to place the top of the connector on or below the plane of the bottom of the meter when the latter is resting on the bottom 22. And if desired, in connection with the adjustable feature, the stirrup may have its ends flattened or the stirrup may be formed of material angular in cross section without departing from the spirit of the invention.

While we have shown a general embodiment of our invention, and have shown and described several ways in which it may be carried out, it will be readily understood that various changes may be made therein to meet various conditions in installations of meters, and we desire it to be understood that we reserve the right to make any and all such changes and modifications therein as may be necessary and which will fall within the spirit and scope of our invention as expressed in the following claims.

Having thus described our invention, what we claim as new is:—

1. A support comprising a hanger member in the form of a stirrup, said stirrup having its upper ends inclined inwardly and upwardly, each end having means for removable and adjustable attachment to a fixed support common to both ends and located approximately midway of the width of the stirrup, the ends being independently adjustable in the direction of length of the stirrup, whereby the stirrup will form a suspended support.

2. A support comprising a hanger member in the form of a stirrup having its upper ends adapted to provide an approximately central suspension support, and a member mounted on the bottom of the stirrup and having its direction of length at an angle to the direction of length of the bottom.

3. A support comprising a hanger member in the form of a stirrup having its upper ends adapted to provide an approximately central suspension support, and a swinging member mounted on the bottom of the stirrup and having its direction of length at an angle to the direction of length of the bottom, said swinging member projecting on opposite sides of the bottom.

4. A support comprising a hanger member in the form of a stirrup having its upper ends adapted to provide an approximately central suspension support, and a swinging member mounted on the bottom of the stirrup and having its direction of length at an angle to the direction of length of the bottom, said swinging member projecting on opposite sides of the bottom, one projecting portion being of greater length than the other.

5. A support comprising a hanger member in the form of a stirrup having its upper ends adapted to provide an approximately central suspension support, and a member mounted on the bottom of the stirrup and having its direction of length at an angle to the direction of length of the bottom, said latter member embodying two arms projecting on opposite sides of the stirrup bottom, the arms on one side being connected together.

6. A support comprising a hanger member in the form of a stirrup having its upper ends adapted to provide an approximately central suspension support, and a member mounted on the bottom of the stirrup and having its direction of length at an angle to the direction of length of the bottom, said latter member embodying two arms projecting on opposite sides of the stirrup bottom, the arms on one side being bent inwardly and connected together to form an abutment.

7. A support comprising a hanger member in the form of a stirrup, said stirrup having its upper ends inclined inwardly and upwardly and adapted to be removably secured to and suspended from a fixed support located approximately midway of the width of the stirrup, the stirrup being adjustable to provide for variations in width of the article being supported.

In testimony whereof we have hereunto set our hands in presence of two subscribing witnesses.

PHILIP MUELLER.
ANTON C. SCHUERMANN.

Witnesses:
WILLIAM R. BIDDLE,
LEONARD F. MCKIBBEN.